United States Patent
Takijiri et al.

(10) Patent No.: US 10,216,162 B2
(45) Date of Patent: Feb. 26, 2019

(54) FLUID CONTROL AND MEASUREMENT SYSTEM WITH A RELAY

(71) Applicant: HORIBA STEC, Co., Ltd., Kyoto (JP)

(72) Inventors: Kotaro Takijiri, Kyoto (JP); Kenichi Oe, Kyoto (JP); Yukimasa Furukawa, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 172 days.

(21) Appl. No.: 14/745,127

(22) Filed: Jun. 19, 2015

(65) Prior Publication Data

US 2015/0370260 A1 Dec. 24, 2015

(30) Foreign Application Priority Data

Jun. 20, 2014 (JP) .................................. 2014-127618

(51) Int. Cl.
*G05D 7/06* (2006.01)
*G05B 19/042* (2006.01)

(52) U.S. Cl.
CPC ....... *G05B 19/0426* (2013.01); *G05D 7/0635* (2013.01)

(58) Field of Classification Search
CPC .................................................. G05D 7/0647
USPC ......................................................... 700/282
See application file for complete search history.

(56) References Cited

U.S. PATENT DOCUMENTS

| | | | |
|---|---|---|---|
| 2006/0000509 A1* | 1/2006 | Pozniak | G05D 7/0647 137/487.5 |
| 2006/0277346 A1* | 12/2006 | Doak | G06F 13/387 710/305 |
| 2010/0246119 A1* | 9/2010 | Collopy | G06F 1/1616 361/679.55 |

FOREIGN PATENT DOCUMENTS

| | | |
|---|---|---|
| CN | 1716138 A | 1/2006 |
| CN | 1249545 C | 4/2006 |
| CN | 102362236 A | 2/2012 |
| CN | 104246119 A | 12/2014 |
| JP | H05134711 A | 6/1993 |
| JP | 07210254 A | 8/1995 |
| JP | 2003504748 A | 2/2003 |

(Continued)

OTHER PUBLICATIONS

Japanese Patent Office, Office Action Issued in Japanese Patent Application No. 2015083949, dated Jan. 5, 2016, 4 pages.

(Continued)

*Primary Examiner* — Emilio J Saavedra
(74) *Attorney, Agent, or Firm* — Alleman Hall Creasman & Tuttle LLP

(57) ABSTRACT

In order to make it possible to diagnose an operation state of a fluidic device despite reducing the size of the fluidic device, a relay is configured to include a first port connected with the fluidic device and a second port connected with a user information processor, and receive fluid-related data from the fluidic device via the first port and transmit the data to the user information processor via the second port, or receive the data from the user information processor via the second port and transmit the data to the fluidic device via the first port. In addition, the relay includes a third port that is connected with a diagnostic apparatus adapted to diagnose the operation state of the fluidic device, receive diagnostic (Continued)

data from the fluidic device via the first port, and transmit the diagnostic data to the diagnostic apparatus via the third port.

3 Claims, 6 Drawing Sheets

(56) References Cited

FOREIGN PATENT DOCUMENTS

| | | | |
|---|---|---|---|
| JP | 2003216227 A | | 7/2003 |
| JP | 2006059322 A | | 3/2006 |
| JP | 2013201665 A | * | 10/2013 |
| WO | 0104715 A1 | | 1/2001 |
| WO | 2010110954 A2 | | 9/2010 |
| WO | 2013158085 A1 | | 10/2013 |

OTHER PUBLICATIONS

State Intellectual Property Office of the People's Republic of China, Office Action and Search Report Issued in Application No. 201510336629.8, dated Nov. 5, 2018, 14 pages.

* cited by examiner

FLUID CONTROL AND MEASUREMENT SYSTEM WITH A RELAY

TECHNICAL FIELD

The present invention relates to a relay of a fluid control and measurement system for controlling or measuring a fluid such as material gas, a chemical solution, or a cleaning solution used for a semiconductor manufacturing process.

BACKGROUND ART

For example, in the case of using multiple gases as with a semiconductor process, a fluidic device such as a fluid controller is provided for each gas line in order to control a flow rate of each of the gases. Such a fluidic device is connected with a user information processor, and configured to transceive data of a type preliminarily set by a user with the user information processor.

Meanwhile, in the case of diagnosing an operation state of each of the fluidic devices, such as when performing maintenance, data selected by the user is transmitted to the user information processor as described above, but pieces of data necessary to diagnose the operation state are not necessarily gathered.

For this reason, a conventional fluidic device is adapted to include a service port for diagnosing an operation state thereof, and by making a cable connection to a diagnostic apparatus used by a maintenance company or the like via the service port, transceive pieces of data necessary for the diagnosis with the diagnostic apparatus.

However, in recent years, a reduction in size of a system has been increasingly demanded, and when reducing the size of a fluidic device to respond to the demand, the fluidic device cannot include a port for making a cable connection to a diagnostic apparatus, causing the problem of being unable to transmit pieces of data from the fluidic device to the diagnostic apparatus.

CITATION LIST

Patent Literature a. Patent Literature 1: JP-A07-210254

SUMMARY OF INVENTION

Technical Problem

Therefore, the present invention is made with a focus on a relay intervening between a fluidic device and a user information processor in order to solve the above-described problem, and a main object thereof is to make it possible to diagnose an operation state of a fluidic device despite reducing the size of the fluidic device.

Solution to Problem

That is, the relay according to the present invention is one that includes a first port connected with a fluidic device adapted to control or measure fluid and a second port connected with a user information processor, and receives fluid-related data as data for controlling or measuring the fluid from the fluidic device via the first port as well as transmitting the fluid-related data to the user information processor via the second port, or receives the fluid-related data from the user information processor via the second port as well as transmitting the fluid-related data to the fluidic device via the first port. In addition, the relay further includes a third port that is connected with a diagnostic apparatus adapted to diagnose an operation state of the fluidic device, and receives diagnostic data for diagnosing the operation state from the fluidic device via the first port as well as transmitting the diagnostic data to the diagnostic apparatus via the third port.

Since such a relay is connected with the diagnostic apparatus, and includes the third port for transmitting the diagnostic data outputted from the fluidic device to the diagnostic apparatus, the diagnostic data can be transmitted to the diagnostic apparatus without making a cable connection between the diagnostic apparatus and the fluidic device.

In doing so, the need for a cable connection port, which has been provided for each fluidic device in the past, can be eliminated, and an operation state of the fluidic device can be diagnosed despite reducing the size of the fluidic device.

In the case of communicating fluid-related data in accordance with predetermined standards, in order to transmit diagnostic data to the diagnostic apparatus without blocking the communication, it is preferable that the first port is connected with a first communication line for communicating the fluid-related data and a second communication line for communicating the diagnostic data.

In doing so, since the diagnostic data is transmitted through the second communication line separately from the first communication line for communicating the fluid-related data set by a user, the diagnostic data necessary to diagnose the fluidic device can be acquired regardless of user settings to flexibly diagnose the fluidic device. That is, without changing the user settings, the diagnostic data can be set, and even a retrofitted diagnostic apparatus can be used to diagnose the fluidic device.

In order to further reduce the size of each fluidic device, it is preferable that the relay has: an identifier assignment part that assigns identifiers for identifying multiple fluidic devices to the respective fluidic devices; and a display part that displays the identifiers of the respective fluidic devices assigned by the identifier assignment part.

In doing so, providing an identifier assignment part and a display part for a fluidic device as before is not required, and therefore each fluidic device can be further reduced in size.

In addition, even in the case of arranging the fluidic devices in an area, for example, beyond the reach or eyeshot of a user, as long as the relay is arranged in an operable area, the identifier assignment part and the display part of the relay make it possible to check connection states or the like of the respective fluidic devices to improve workability.

Embodiments that make the effect of the present invention more obvious include one configured such that respective fluidic devices have casings of a flat shape, and mutually adjacent ones of the fluidic devices can be disposed without any gap by making adjacent face plate parts of the casings face each other.

Also, a fluid control and measurement system according to the present invention is one including: a fluidic device that controls or measures fluid; a user information processor; and a relay that has a first port connected with the fluidic device and a second port connected with the user information processor, and receives fluid-related data as data for controlling or measuring the fluid from the fluidic device via the first port as well as transmitting the fluid-related data to the user information processor via the second port, or receives the fluid-related data from the user information processor via the second port as well as transmitting the fluid-related data to the fluidic device via the first port. In addition, the relay further includes a third port that is connected with a diagnostic apparatus adapted to diagnose an operation state of the fluidic device, and receives diagnostic data for diagnosing the operation state from the fluidic device via the first port as well as transmitting the diagnostic data to the diagnostic apparatus via the third port.

Such a fluid control and measurement system can obtain the same working effect as that of the above-described relay.

Advantageous Effects of Invention

According to the present invention configured as described, an operation state of a fluidic device can be diagnosed despite reducing the size of the fluidic device.

DESCRIPTION OF EMBODIMENTS

A fluid control and measurement system according to the present invention is described below with reference to the drawings.

Figure 1:
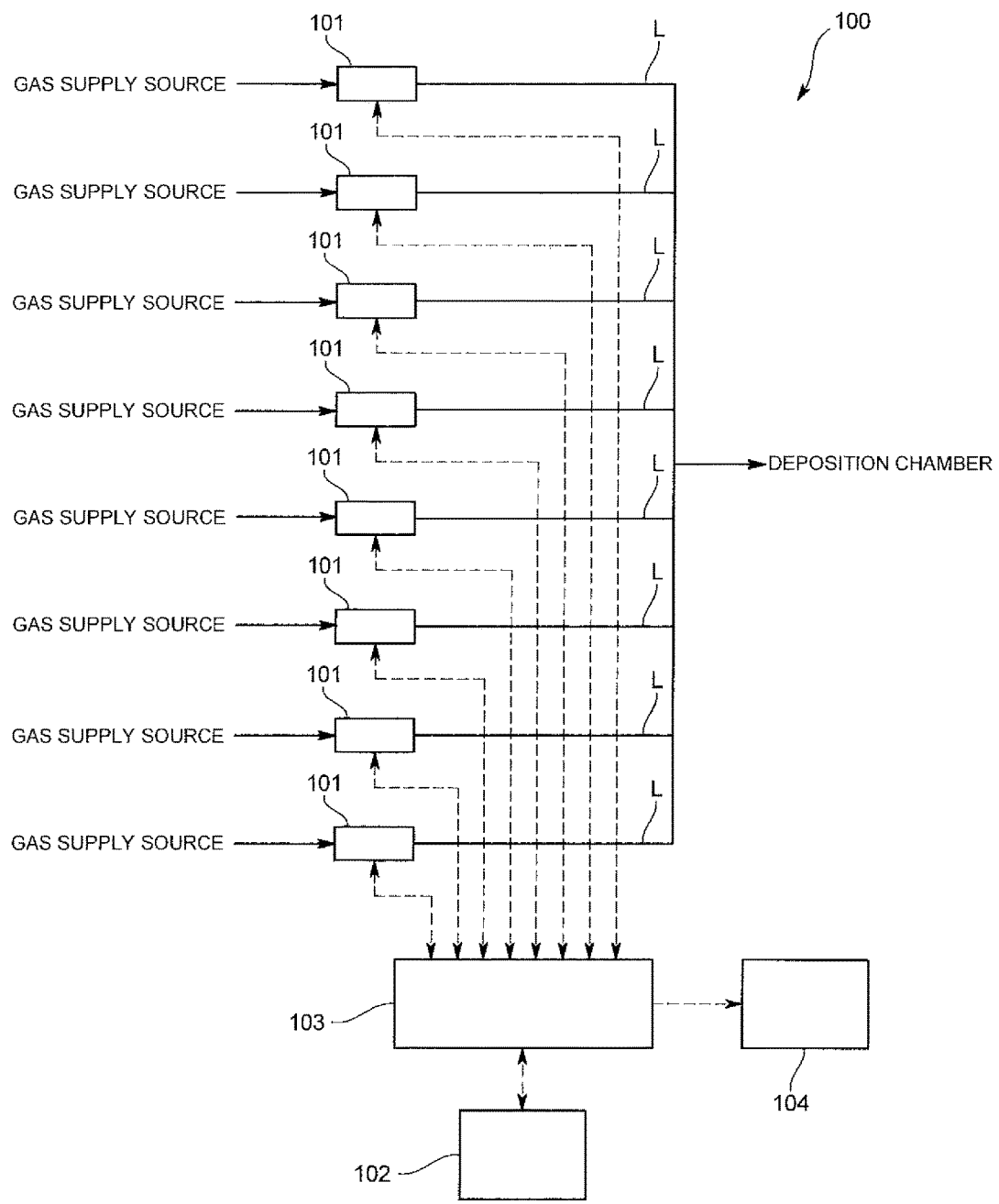
FIG. 1 is a diagram schematically illustrating a fluid control and measurement system in the present embodiment.

As illustrated in FIG. 1, the fluid control and measurement system 100 is one that is used for, for example, introducing various gases for semiconductor manufacturing system deposition respectively from gas supply sources, and mixing them to supply the mixture to a semiconductor deposition chamber (not illustrated). Also, the fluid control and measurement system 100 includes: a flow path forming member that forms flow paths L (hereinafter also referred to as gas flow paths) for the respective gases; flow rate controllers 101 as fluidic devices that are respectively provided in the gas flow paths L to independently control flow rates of the gases flowing through the gas flow paths L; a user information processor 102 that can communicate with the respective flow rate controllers 101; a relay 103 that intervenes between the flow rate controllers 101 and the user information processor 102; and a diagnostic apparatus 104 that diagnoses operation states of the respective flow rate controllers 101, i.e., diagnoses whether or not the respective flow rate controllers 101 normally operate.

Note that the fluidic devices include, for example, a fluid controller adapted to control a physical property of fluid such as pressure, flow rate, temperature or viscosity, and a fluid measurement device adapted to measure the physical property.

Next, respective parts of the fluid control and measurement system 100 are specifically described.

The flow path forming member is configured on a panel by, for example, consecutively providing multiple block bodies planarly although not illustrated. Each of the block bodies includes an internal flow path, and by appropriately consecutively providing the block bodies to connect the internal flow paths of the respective block bodies, the multiple parallel gas flow paths L are formed as described above. As the block bodies, various types of block bodies are prepared, such as a block body that can be equipped with a fluidic device such as a pressure sensor, a valve, or the below-described flow rate controller 101, and a block body in which a branching flow path is formed. The reason why the flow path forming member is formed of such block bodies is because the block bodies can be closely disposed without any gap, on which the fluidic devices can be integrally equipped, resulting in reduction in size, and consequently, a flow path can be shortened to reduce a dead space and improve responsiveness. Note that as the flow path forming member, a typical piping member may be used.

Figure 2:
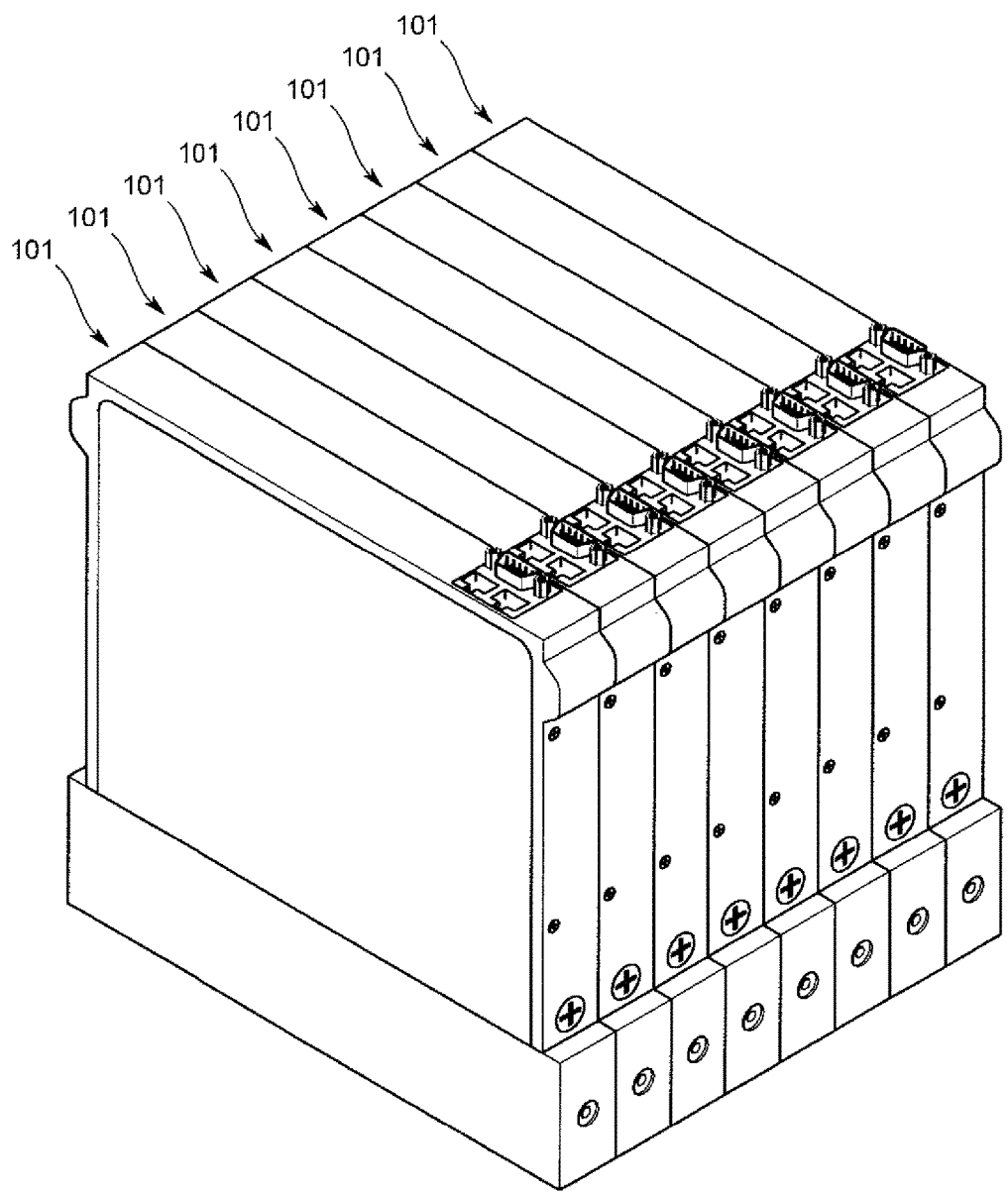
FIG. 2 is a perspective reference diagram illustrating flow rate controllers in the same embodiment.
Figure 3:
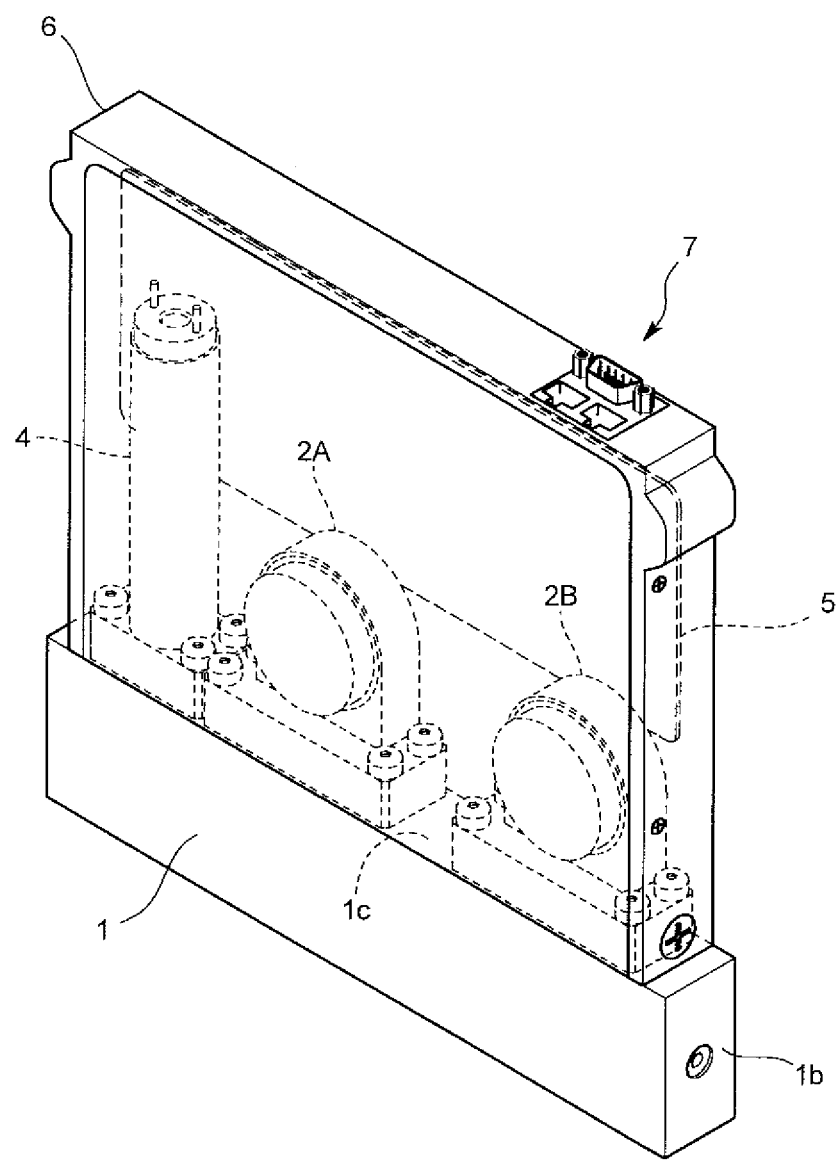
FIG. 3 is a perspective reference diagram illustrating a configuration of each flow rate controller in the same embodiment.
Figure 4:
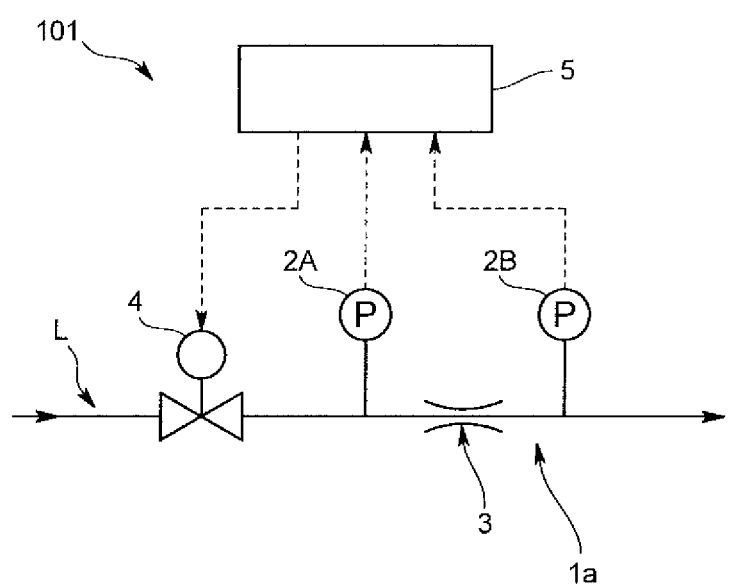
FIG. 4 is a reference diagram illustrating the configuration of the flow rate controller in the same embodiment.

Each of the flow rate controllers 101 is one that as illustrated in FIGS. 2 and 4, includes: pressure sensors 2A and 2B, a fluid resistance element 3, a flow rate adjustment valve 4, and an electric circuit board 5, which are equipped by a block body 1 for equipping a flow rate controller (hereinafter also simply referred to as a block body); and a casing 6 that contains them.

In addition, as particularly illustrated in FIG. 2, the present embodiment is configured such that, the casings 6 are of a flat shape, and by making adjacent face plate parts of the casings 6 face each other, mutually adjacent flow rate controllers 101 can be disposed without any gap. In doing so, the overall fluid control and measurement system 100 can be made compact.

The block body 1 is of an elongated rectangular parallelepiped shape, and in front and rear end surfaces 1b formed orthogonal to the longer direction of the block body 1, a gas introduction port and a gas lead-out port are respectively provided. Further, in the block body 1, an internal flow path 1a through which gas flows along the longer direction in a plan view is formed so as to connect the respective ports to each other.

In addition, in the internal flow path 1a, the flow rate adjustment valve 4, first pressure sensor 2A, fluid resistance element 3, and second pressure sensor 2B are provided sequentially from the upstream side. Also, on the upper surface 1c of the block body 1 (i.e., a surface that is parallel to the longer direction of the block body 1 and orthogonal to the end surfaces 1b) is set as a part attachment surface, and on the part attachment surface, the below-described housings of the flow rate adjustment valve 4 and the pressure sensors 2A and 2B are provided.

The flow rate adjustment valve 4 is one that includes a valve body (not illustrated) provided in the internal flow path 1a, and an actuator (not illustrated) adapted to open/close the valve body. The actuator is one that uses, for example, a stacked piezo element that is expandable/contractable in its thickness direction, and contained in the housing of a tubular shape attached on the part attachment surface. In addition, a valve opening level of the valve body is adapted to be adjustable by expanding or contracting the actuator.

Each of the pressure sensors 2A and 2B is one that includes the housing of a flat shape and a pressure sensing element incorporated in the housing. In addition, the housing is attached on the part attachment surface such that face plate parts (flat surfaces) of the housing are vertical to the part attachment surface and parallel to the longer direction of the block body 1, i.e., the face plate parts are substantially parallel to a flow direction of fluid in a plan view.

The fluid resistance element 3 is one that forms a narrow passage part provided in the internal flow path 1a, and in this embodiment, embedded inside the block body 1.

On the electric circuit board 5, digital circuits such as a CPU, a memory, and a communication circuit, and analog circuits such as an amplifier and a buffer are formed. Also, the respective circuits cooperate, and thereby in functional terms, the electric circuit board 5 fulfills functions as: a flow rate measurement part that measures a flow rate of gas flowing through the gas flow path L (a gas flow path as the internal flow path 1a of the block body 1); and a flow rate control part that controls the gas flow rate sensed by the flow rate measurement part to a predetermined target flow rate.

The flow rate measurement part is one that calculates the flow rate of the gas flowing through the gas flow path L on the basis of pressures in the gas flow path L measured by the pressure sensors 2A and 2B provided upstream and downstream of the fluid resistance element 3, respectively. The gas flow rate (hereinafter also referred to as a measured flow rate) calculated in this manner is outputted to the flow rate control part as a measured flow rate signal.

The flow rate control part is one that receives a target flow rate signal and the measurement signal, compares the target flow rate and the measured flow rate respectively indicated by the signals, and outputs an operation signal for driving the flow rate adjustment valve 4 so as to minimize the deviation between the target flow rate and the measured flow rate. In addition, the flow rate control part is adapted to receive a valve open/close signal as well, and upon receipt of the valve open/close signal, forcibly fully opens or fully closes the flow rate adjustment valve 4 regardless of a value of the target flow rate signal.

Each of the flow rate controllers 101 configured as described is cable-connected to the user information processor 102 via a connector 7 provided in an upper plate part of the casing 6.

The user information processor 102 is connected with the multiple flow rate controllers 101 via cables, and configured to be communicable with the respective flow rate controllers 101. Specifically, the user information processor 102 is a general-purpose or dedicated computer including a CPU, a memory, an input/output interface, an AD converter, and the like.

In more detail, in the present embodiment, the user information processor 102 is one that transceives data for controlling a flow rate of fluid with each of the flow rate controllers 101 as fluid-related data. Specifically, the fluid-related data is data used for a recipe of a semiconductor manufacturing apparatus, and data necessary for data processing by the user information processor 102. That is, the fluid-related data is data needed (defined) by the user information processor 102.

Pieces of fluid-related data transmitted from the user information processor 102 to each of the flow rate controllers 101 include the target flow rate signal indicating a target flow rate, the valve open/close signal for forcibly opening/closing a corresponding flow rate adjustment valve 4, and the like. On the other hand, pieces of fluid-related data transmitted from each of the flow rate controllers 101 to the user information processor 102 include the measured flow rate signal indicating a measured flow rate, measured pressure signals indicating pressures measured by respective corresponding pressure sensors 2A and 2B, a valve opening level signal indicating an opening level of a corresponding flow rate adjustment valve 4 (voltage applied to the valve 4), a fluid temperature signal indicating the temperature of corresponding fluid, and the like.

In addition, the user information processor 102 is configured to transceive one or more types of data preset by a user from among the above-described pieces of fluid-related data with each of the flow rate controllers 101.

Figure 5:
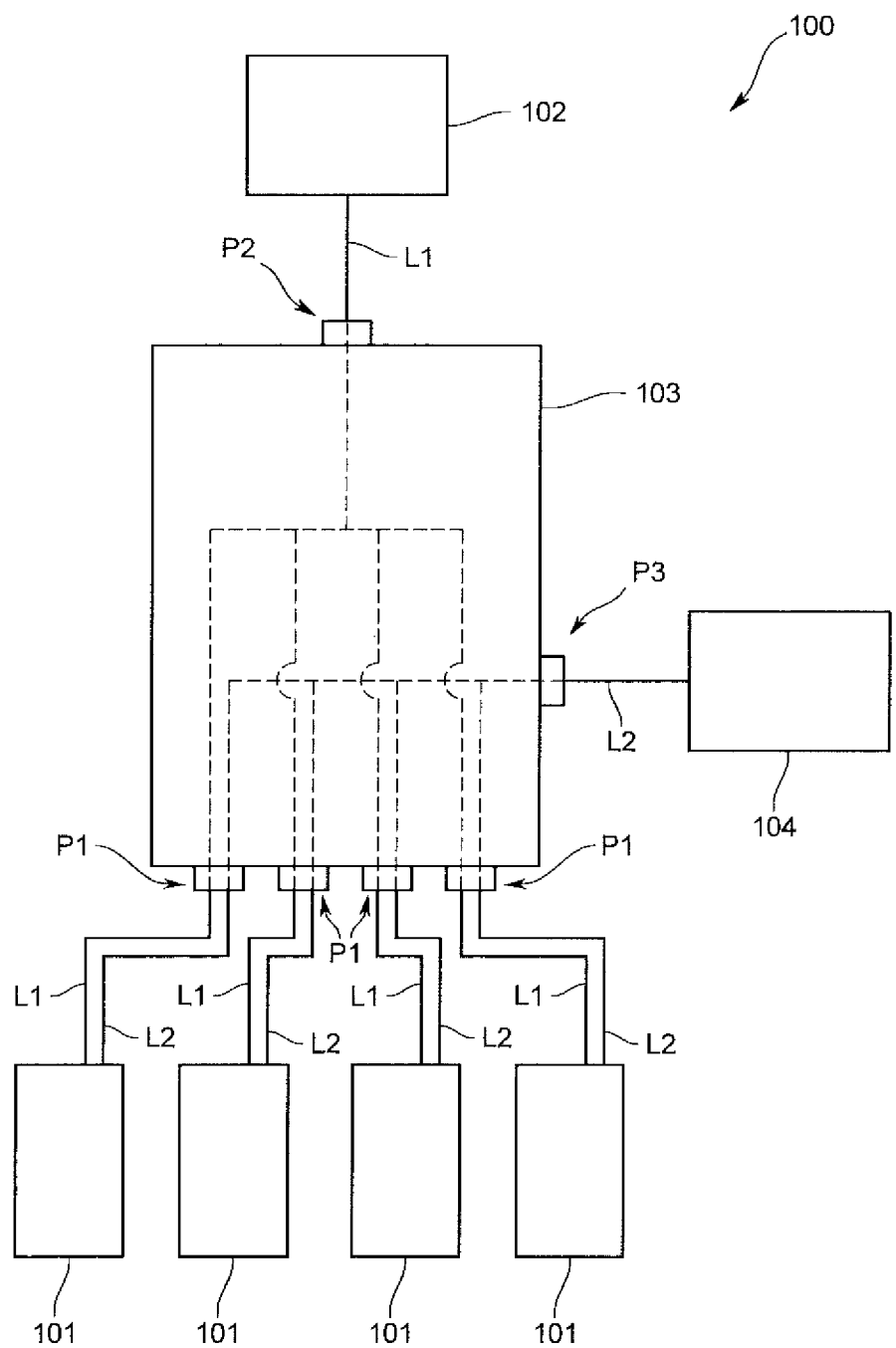
FIG. 5 is a schematic diagram illustrating a relay in the same embodiment.
Figure 6:
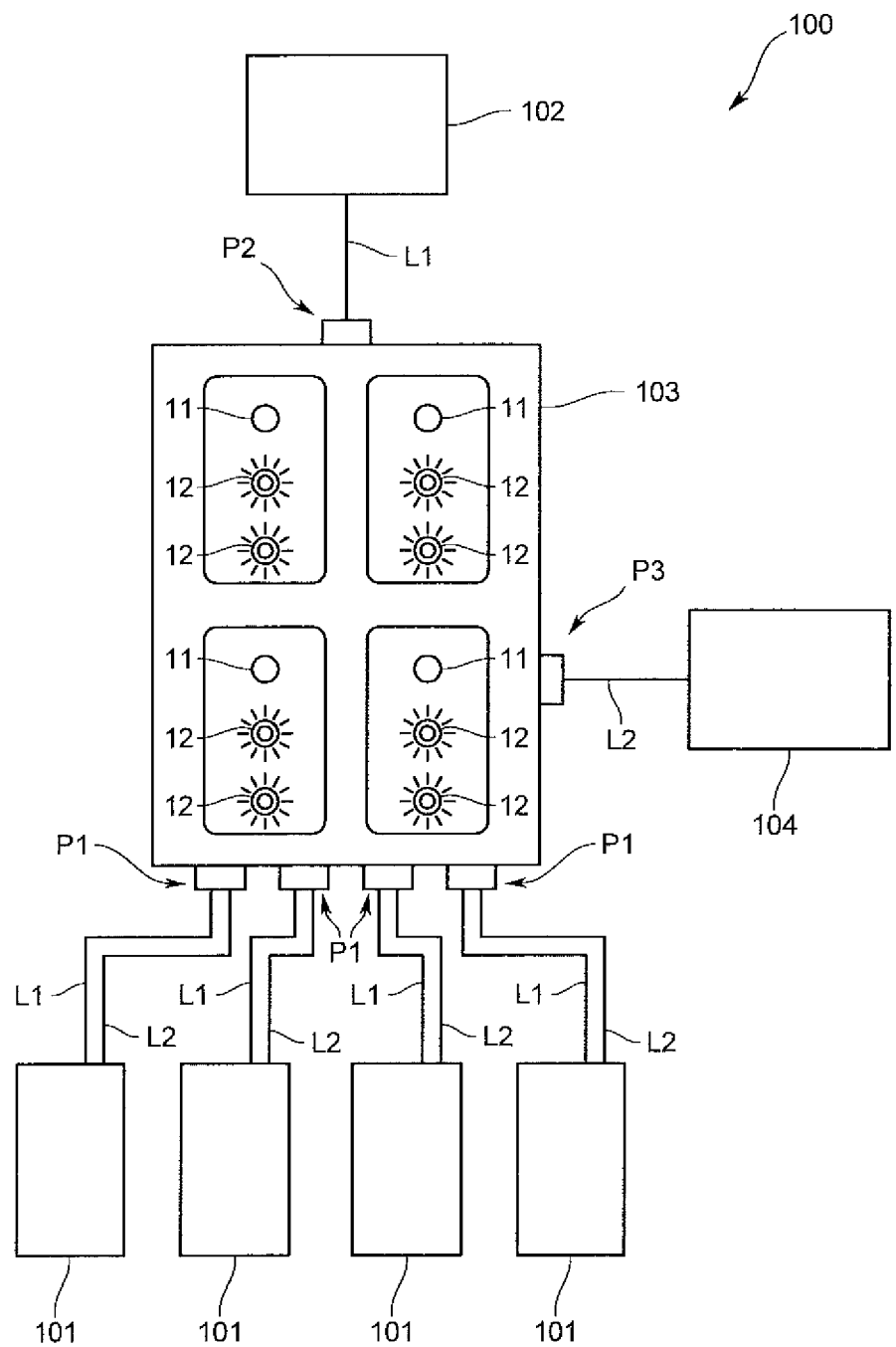
FIG. 6 is a schematic diagram illustrating the relay in the same embodiment.

Note that the fluid control and measurement system 100 in the present embodiment includes the relay 103 that as illustrated in FIGS. 5 and 6, intervenes between the above-described multiple flow rate controllers 101 and the user information processor 102 and relays the above-described piece of fluid-related data between them.

In addition, for descriptive convenience, FIG. 5 omits illustrating respective components provided on the outer circumference surface of the relay 103, whereas FIG. 6 omits illustrating an internal configuration of the relay 103.

The relay 103 is described below.

As illustrated in FIGS. 5 and 6, the relay 103 includes: first ports P1 that are respectively connected with the flow rate controllers 101 and for transceiving the pieces of fluid-related data with the flow rate controllers 101; and a second port P2 that is connected with the user information processor 102 and for transceiving the pieces of fluid-related data with the user information processor 102.

In more detail, the relay 103 is configured to transmit pieces of fluid-related data received from the flow rate controllers 101 via the corresponding first ports P1 to the user information processor 102 via the second port P2, and transmit pieces of fluid-related data received from the user information processor 102 via the second port P2 to the flow rate controllers 101 via the corresponding first ports P1.

In the present embodiment, the multiple first ports P1 are provided corresponding to the respective flow rate controllers 101, and the respective first ports P1 and the second port P2 are connected with first communication lines L1 for communicating the pieces of fluid-related data between the flow rate controllers 101 and the user information processor 102.

The first communication lines L1 are lines for communicating the pieces of fluid-related data in accordance with predetermined standards such as differential transmission communication (in the present embodiment, CAN communication), and specifically formed of first communication cables of which one ends are connected to the respective flow rate controllers 101 and the other ends are connected to the user information processor 102. In addition, the first communication cables are respectively connected to unillustrated physical connectors provided for the flow rate controllers 101, first ports P1, second port P2, and user information processor 102. Note that the first communication cables are physical ones such as electric cables.

In more detail, the present embodiment is configured to communicate the pieces of fluid-related data between the user information processor 102 and the relay 103 through DeviceNet, and between the relay 103 and the respective flow rate controllers 101 through CAN. Note that in place of DeviceNet, EtherCAT may be used.

In the present embodiment, as illustrated in FIG. 5, the multiple first communication lines L1 connected to the respective flow rate controllers 101 via the corresponding first ports P1 meet together between the first ports P1 and the second port P2, and are then connected to the user information processor 102 via the second port P2.

Note that the present embodiment is configured to be able to appropriately switch to a flow rate controller 101 communicable with the user information processor 102 using, for example, an unillustrated switching element or the like. Also, in the present embodiment, a CPU such as a repeater is provided for the first communication lines L1. That is, the CPU such as a repeater is one that is provided inside the relay 103, and connected with the first communication lines L1.

Also, the relay 103 in the present embodiment has an unillustrated isolator such as a photo coupler in a first communication line L1, and configured to isolate the respective flow rate controllers 101 and the user information processor 102 from each other. Specifically, the isolator is provided on the user information processor 102 side of the meeting point of the first communication lines L1.

Further, as illustrated in FIGS. 5 and 6, the relay 103 in the present embodiment is connected with the diagnostic apparatus 104 that diagnoses the operation state of each of the flow rate controllers 101, and further includes a third port P3 for transceiving pieces of diagnostic data, which are for diagnosing the operation state, with the diagnostic apparatus 104. The pieces of diagnostic data may be ones including at least data not included in the above-described pieces of fluid-related data.

Note that the pieces of diagnostic data are ones that can be used to diagnoses the operation state of each of the flow rate controllers 101, and obtained by the flow rate controller 101. Specifically, the pieces of diagnostic data include the target flow rate signal indicating a target flow rate, the valve open/close signal for forcibly opening/closing a corresponding flow rate adjustment valve 4, the measured flow rate signal indicating a measured flow rate, the measured pressure signals indicating pressures measured by corresponding pressure sensors 2A and 2B, the valve opening level signal indicating an opening level of the flow rate adjustment valve 4 (voltage applied to the valve 4), a raw signal indicating a raw value of each sensor, a drift integration signal indicating a drift integrated value of each sensor, a self-diagnostic signal indicating a self-diagnostic value using a measured flow rate obtained when the flow rate adjustment valve 4 is closed (e.g., International Publication WO2008/053839), and the like.

Note that in the case where a user selects so as to transceive all pieces of fluid-related data between the flow rate controllers 101 and the user information processor 102, the pieces of fluid-related data and the pieces of diagnostic data are identical to each other.

The third port P3 is provided separately from the second port P2, and the relay 103 in the present embodiment is configured to transmit the pieces of diagnostic data received from each of the flow rate controllers 101 via a corresponding first port P1 to the diagnostic apparatus 104 via the third port P3.

In the present embodiment, the third port P3 is connected with, second communication lines L2 for communicating the pieces of diagnostic data between the respective flow rate controllers 101 and the diagnostic apparatus 104.

The second communication lines L2 are formed of second communication cables different from the first communication cables, of which one ends are respectively connected to the flow rate controllers 101 and the other ends are connected to the diagnostic apparatus 104. In addition, the second communication cables are connected to unillustrated physical connectors respectively provided for the flow rate controllers 101, first ports P1, third port P3, and diagnostic apparatus 104. Note that the second communication cables are physical ones such as electric cables.

In the present embodiment, as illustrated in FIG. 5, the multiple second communication lines L2 connected to the respective flow rate controllers 101 via the corresponding first ports P1 meet together between the first ports P1 and the third port P3, and are then connected to the diagnostic apparatus 104 via the third port P3.

In addition, each of the first ports P1 includes a first communication line terminal (not illustrated) connected with a corresponding first communication line L1, and a second communication line terminal (not illustrated) connected with a corresponding second communication line L2, and is thereby configured to be able to separately independently transceive the pieces of fluid-related data and the pieces of diagnostic data between a corresponding flow rate controller 101 and the relay 103.

Also, as illustrated in FIG. 6, the relay 103 in the present embodiment further includes: identifier assignment parts 11 that respectively assign identifiers for identifying the multiple flow rate controllers 101 to the flow rate controllers 101: and display parts 12 that respectively display the identifiers of the flow rate controllers 101 assigned by the identifier assignment parts 11, operation states, and the like.

The identifier assignment parts 11 are provided, for example, on the outer circumference surface of the relay 103 correspondingly to the respective flow rate controllers 101 connected to the user information processor 102.

Specifically, the identifier assignment parts are ones using DIP switches such as rotary switches, and configured to, for example, assign mutually different values to the flow rate controllers 101, respectively.

The display parts 12 are provided, for example, on the outer circumferential surface of the relay 103 correspondingly to the respective identifier assignment parts 11.

Specifically, the display parts are ones using, for example, LEDs or the like, and configured to display the identifiers of the flow rate controllers 101 (in the present embodiment, values of the flow rate controllers 101) assigned by the corresponding identifier assignment parts 11, respectively.

In the fluid control and measurement system 100 according to the present embodiment configured as described, since the relay 103 includes the third port P3, and the respective flow rate controllers 101 and the diagnostic apparatus 104 are connected to each other via the third port P3, the pieces of diagnostic data can be transmitted to the diagnostic apparatus 104 without making cable connections between the diagnostic apparatus 104 and the flow rate controllers 101.

In doing so, the need for a cable connection port, which has been provided for each of the flow rate controllers 101 in the past, can be eliminated, and the operation state of each of the flow rate controllers 101 can be diagnosed despite reducing the size of the flow rate controller 101.

Further, making cable connections between the respective flow rate controllers 101 and the diagnostic apparatus 104, which has been needed in the past, is not needed, and therefore the number of cables can be dramatically reduced.

Also, since each of the first ports P1 is connected with: a corresponding first communication line L1 for communicating the pieces of fluid-related data in accordance with the predetermined standards; and separately from the first communication line L1, a corresponding second communication line L2 for communicating the pieces of diagnostic data, and a corresponding flow rate controller 101 is configured to be able to separately independently transceive the pieces of fluid-related data and the pieces of diagnostic data, the pieces of diagnostic data outputted from the flow rate controller 101 can be transmitted to the diagnostic apparatus 104 without blocking the communication in accordance with the predetermined standards in the first communication line L1.

Note that if delay occurs in fluid control or measurement in a semiconductor manufacturing apparatus, the quality of semiconductor products as finished products may be deteriorated. For this reason, in order to ensure communication speed, the first communication lines L1 are often configured to communicate only data set by a user. Even in such a semiconductor manufacturing apparatus, since the above-described embodiment is configured to communicate the pieces of diagnostic data through the second communication lines L2 provided separately from the first communication lines L1, the pieces of diagnostic data necessary to diagnose each of the flow rate controllers 101 can be obtained regardless of user settings, and therefore the flow rate controller 101 can be flexibly diagnosed.

Further, since the relay 103 includes the identifier assignment parts 11 and the display parts 12, providing each of the flow rate controllers 101 with an identifier assignment part 11 and a display part 12 as before is not necessary, and therefore the flow rate controller 101 can be further reduced in size.

Also, even in the case of arranging the flow rate controllers 101 in an area, for example, beyond the reach or eyeshot of a user, as long as the relay 103 is arranged in an operable area, the identifier assignment parts 11 and the display parts 12 of the relay 103 make it possible to check connection states of the respective flow rate controllers 101 to improve workability.

In addition, since the relay 103 includes the isolator without providing an isolator for each of the flow rate controllers 101, the flow rate controller 101 and the user information processor 102 can be isolated from each other, and the flow rate controller 101 can be further reduced in size.

Also, the isolator is provided on the user information processor 102 side of the meeting points of the first communication lines L1, thus reducing cost as compared with the case of providing an isolator for each of the flow rate controllers 101. Note that in this configuration, the respective flow rate controllers 101 are not isolated from each other. However, the pieces of fluid-related data are transmitted in accordance with the differential transmission communication, and therefore noise between the respective flow rate controllers 101 can be suppressed to the extent of not affecting fluid control or measurement.

Note that the present invention is not limited to the above-described embodiment.

For example, the above-described embodiment is configured to connect a first communication line and a second communication line connected to each of the flow rate controllers to the same first port; however, the present invention may be configured to connect the first communication line and the second communication line to mutually different first ports, respectively.

Also, the relay in the above-described embodiment is configured to transceive the pieces of diagnostic data with the diagnostic apparatus connected to the third port provided separately from the second port, but for example, the connector of the second port and the connector of the third port may be configured as a single shared connector.

Further, the above-described embodiment is configured such that each of the first communication lines and each of the second communication lines are formed of different types of communication cables, respectively; however, the present invention may be configured such that some of the first communication lines and some of the second communication lines are formed of the same type of communication cables, respectively.

In addition, the relay may be configured to transceive the pieces of fluid-related data and the pieces of diagnostic data, which are transceived with each of the flow rate controllers via a corresponding first port, through a single communication line.

In this case, it is only necessary to, for example, provide the relay with a CPU or the like, and on the basis of settings of the CPU or the like, transceive the pieces of fluid-related data, which are communicated through the single communication line, with the user information processor via the second port, and the pieces of diagnostic data with the diagnostic apparatus via the third port.

Further, the present embodiment is configured such that the diagnostic apparatus of the present embodiment diagnoses the operation states of the flow rate controllers; however, the present invention may be configured such that the relay receives maintenance data for correcting or calibrating each of the flow rate controllers from the diagnostic apparatus via the third port, and transmits the maintenance data to the flow rate controller via the first port, and the diagnostic apparatus diagnoses the operation state of the flow rate controller as well as doing maintenance such as the correction or calibration of the flow rate controller.

Note that the term "diagnosis" here includes correction, calibration, and the like.

In addition, the DIP switches in the above-described embodiment are the rotary switches, but may be slide switches, push-lock switches, or the like.

Also, the present invention may be configured such that the multiple flow rate controllers are, for example, mutually daisy-chained, and one or more of the multiple flow rate controllers are connected to the relay.

Further, in the above-described embodiment, the CPU such as a repeater is provided for the first communication lines, but a CPU such as a repeater may be separately provided for the second communication lines, or one or more CPUs such as repeaters may be provided for the first communication lines and the second communication lines in common.

Still further, the relay in the above-described embodiment is one that intervenes between the multiple flow rate controllers and the user information processor, but may be provided corresponding to each of the flow rate controllers.

In addition, the fluid control and measurement system in the above-described embodiment is configured to transceive the pieces of fluid-related data between the flow rate controllers and the user information processor, but may be configured to transmit the pieces of fluid-related data only from the flow rate controllers to the user information processor, or only from the user information processor to the flow rate controllers.

Also, it is only necessary that the third port is one for transceiving one or more pieces of data at least including data not included in the pieces of fluid-related data, and the third port is not limited to one for transceiving the pieces of diagnostic data.

Besides, it should be appreciated that the present invention is not limited to any of the above-described embodiments, and can be variously modified without departing from the scope thereof.

REFERENCE SIGNS LIST

100: Fluid control and measurement system
101: Flow rate controller
102: User information processor
103: Relay

104: Diagnostic apparatus
P1: First port
P2: Second port
P3: Third port
L1: First communication line
L2: Second communication line
11: Identifier assignment part
12: Display part

The invention claimed is:

1. A fluid control and measurement system comprising:
a fluidic device that controls or measures fluid;
an information processor; and
a relay that comprises a first port connected with the fluidic device and a second port connected with the information processor, and receives fluid-related data as data for controlling or measuring the fluid from the fluidic device via the first port as well as transmitting the fluid-related data to the information processor via the second port, or receives the fluid-related data from the information processor via the second port as well as transmitting the fluid-related data to the fluidic device via the first port,
the relay further comprising a third port that is connected with a diagnostic apparatus adapted to diagnose an operation state of the fluidic device, and receiving diagnostic data for diagnosing the operation state from the fluidic device via the first port as well as transmitting the diagnostic data to the diagnostic apparatus via the third port, wherein
a first communication line terminal connected with a first communication cable for communicating the fluid-related data is arranged in the first port,
a second communication line terminal connected with a second communication cable different from the first communication cable for communicating the diagnostic data is arranged in the first port, and
the first communication cable transmits the fluid-related data in accordance with a predetermined standard, the second communication cable transmits the diagnostic data in accordance with a standard different from the predetermined standard, and the fluid-related data and diagnostic data are transmitted separately and independently between the fluidic device and the relay.

2. The fluid control and measurement system according to claim 1, wherein the relay has:
an identifier assignment part that assigns identifiers for identifying multiple fluidic devices to the respective fluidic devices; and
a display part that displays the identifiers of the respective fluidic devices, the identifiers being assigned by the identifier assignment part.

3. The fluid control and measurement system according to claim 1, configured such that respective fluidic devices have casings of a flat shape, and mutually adjacent ones of the fluidic devices can be disposed without any gap by making adjacent face plate parts of the casings face each other.

* * * * *